UNITED STATES PATENT OFFICE 2,189,091

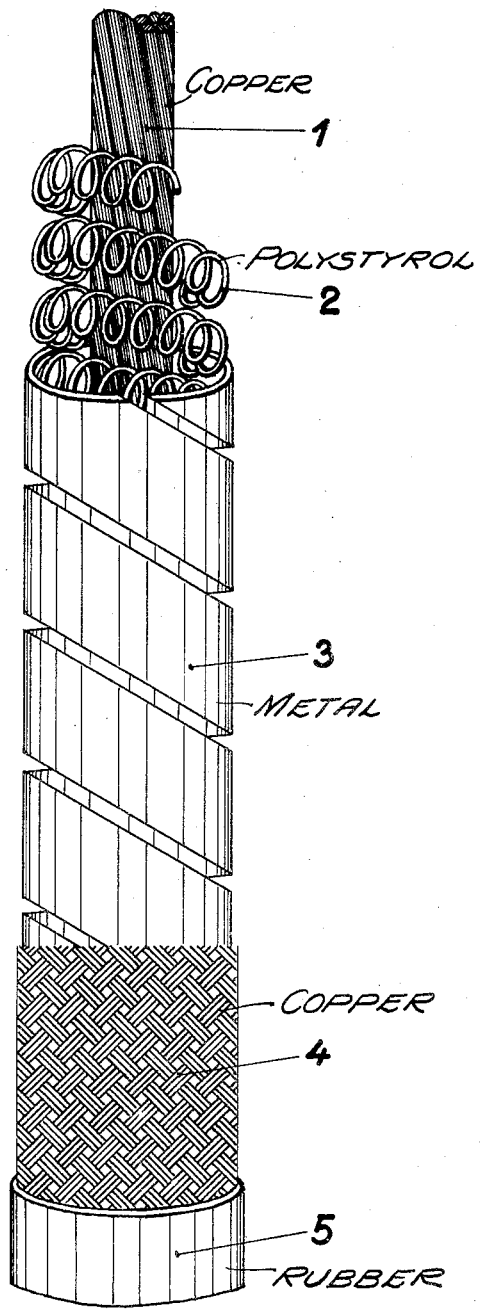

FLEXIBLE HIGH FREQUENCY CABLE

Franz Unterbusch, Cologne-Mulheim, Germany, assignor to Felten & Guilleaume Carlswerk Actien-Gesellschaft, Cologne-Mulheim, Germany Application November 7, 1936, Serial No. 109,763
In Germany December 2, 1935

1 Claim. (Cl. 174—29)

It is known in high frequency cables with a concentric arrangement of the conductors to obtain a high longitudinal conductivity by making the concentric return conductor of flat copper wires, or wires of circular cross-section, which are laid round the other insulated conductor. It has been found that such a return conductor becomes contorted when the cable is twisted, namely, in such a way that individual wires are buckled inwards, with the result that the insulation, which in the case of high frequency cables has to be built up as an air-space insulation, is pierced and may lead to a short circuit with the inner conductor.

According to the invention the return conductor is made of a braiding of flat copper wires, or copper wires of circular cross-section and one or more helical bands of metal is or are provided under the tubular braiding for the purpose of resisting pressure. Such a cable has a greater flexibility and, more particularly, the return conductor is not sensitive with respect to twisting.

The inner conductor must also be flexible, and for this reason it is preferably made of a copper strand.

A protective covering of rubber or similar flexible material is preferably provided over the outer conductor. In order to protect the cable against mechanical influences it may further be provided with an armouring in a known manner.

One form of carrying the invention into effect is illustrated, by way of example, in the accompanying drawing, in which 1 is a metal strand, 2 a helix of insulating material, for instance polystyrol, which is formed of closely adjacent helical turns and is placed around the strand 1 to serve as a distance holder. A band 3 is placed on the helix 2, being wound thereon in helical turns and leaving a free space between the turns. This helical band 3 serves as a supporting member for a wire braiding 4, which is surrounded by a protective covering 5.

What I claim is:

A flexible high frequency cable having an inner conductor, an outer tubular conductor concentric therewith and consisting of a wire braiding, a solid insulating material applied in such a manner as to provide a substantial airspace between the said two conductors and a metal band wound in the form of an open helix between the said airspace insulation and the said outer tubular conductor of wire braiding, said helically wound metal band supporting the wire braiding conductor.

FRANZ UNTERBUSCH.